Nov. 20, 1934.                J. G. SHODRON                1,981,435
MATERIAL HANDLING MECHANISM
Original Filed Oct. 14, 1932
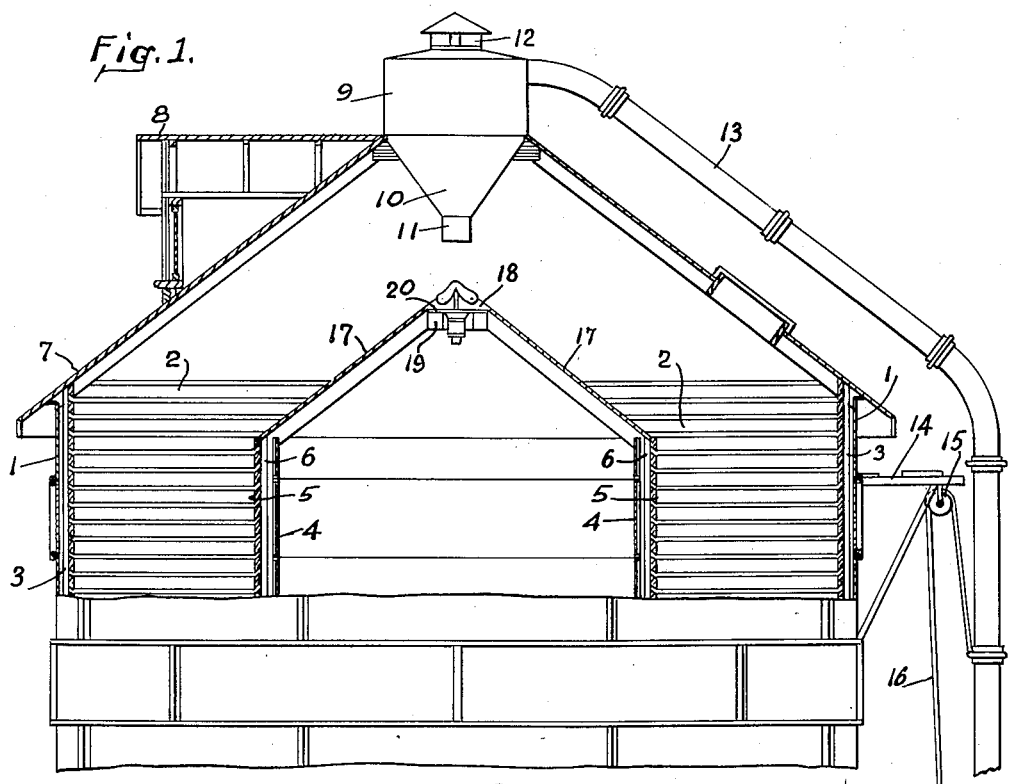
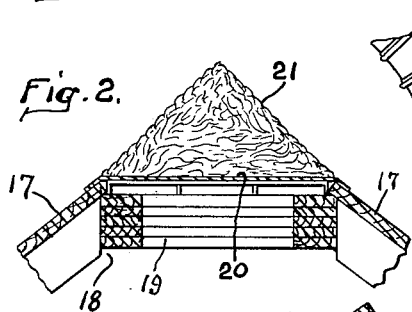
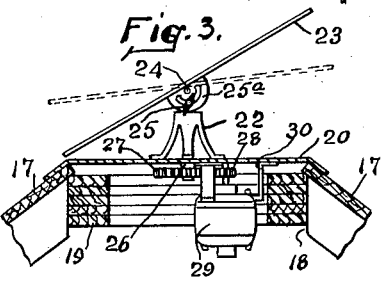
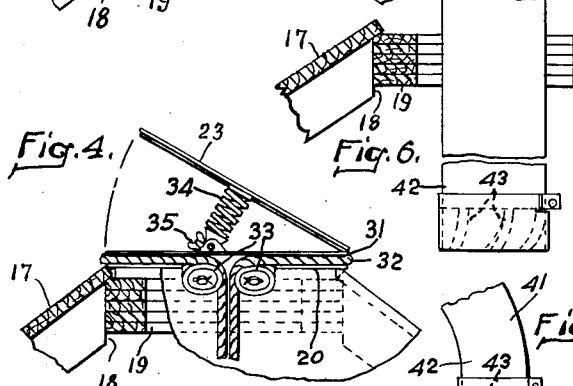
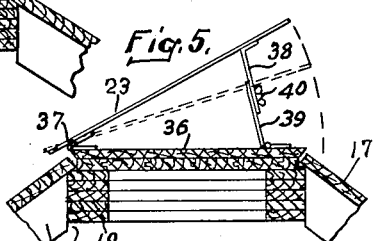
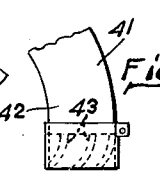
Inventor
JOHN G. SHODRON,
By Toulmin & Toulmin
Attorneys Patented Nov. 20, 1934

1,981,435

UNITED STATES PATENT OFFICE 1,981,435

MATERIAL HANDLING MECHANISM

John G. Shodron, Fort Atkinson, Wis., assignor to James Manufacturing Company, Fort Atkinson, Wis., a corporation of Wisconsin Original application October 14, 1932, Serial No. 637,818. Divided and this application May 22, 1933, Serial No. 672,222

11 Claims. (Cl. 214—17)

This invention relates to improvements in means for handling feed stuffs, and has for its object to provide, in connection with a silo, means for delivering feed, such as hay, to a chamber and distributing the hay to various parts of the chamber.

It also has for its object to provide a rotating platform onto which feed is delivered and from which it is distributed by rotation.

It is also an object of this invention to provide a rotating and tiltable platform for distributing hay and similar feed materials to a container. The platform not only tilts but rotates.

These and other objects and advantages will appear from the following description taken in connection with the drawing.

This is a division of my copending application, Ser. No. 637,818, filed October 14, 1932.

Referring to the drawing:

Figure 1 shows the upper part of a feed storage building with the roof and the upper parts of the walls thereof in vertical section.

Figure 2 shows a section of the apex of the silo roof with a platform thereon, and a pile of chopped hay on the platform, which makes it difficult to secure a perfect distribution of the hay.

Figure 3 is a section through the apex of the silo roof showing a tilting and rotating means for distributing the chopped hay.

Figure 4 is a view similar to Figure 3, showing a modified form of means for tilting the hay distributing means.

Figure 5 is a view similar to Figures 3 and 4, with still another modified form of means for tilting the hay distributing means.

Figure 6 is a section through the apex of the silo showing a delivery chute extending through the apex.

Figure 7 is a view showing the spout end of the chute.

The outer wall of the feed storage building is indicated by the numeral 1, and has inside thereof and closely adjacent it, a wall 2 formed of horizontally arranged spaced boards. Between the outer wall and the wall 2 are studdings 3, which serve to support the boards that form the spaced wall and provide a space between the boards and the outer wall 1.

There is an inside wall 4 which forms the silo part of the storage building. Around the periphery and between the silo wall and the outside wall 1, and adjacent the silo wall, is a spaced wall 5 composed of horizontally arranged boards supported on studdings 6 which provide a space between the boards and the inner wall for the circulation of air.

Resting upon the outer wall 1 is the usual roof 7. In the present instance the walls are circular in shape and have mounted above them for protection a cone-shaped roof. In one side of the roof is a dormer window 8, while in the apex of the roof there is an opening circular in shape in which there is located a centrifugal collector 9. Below this centrifugal collector is a cone member 10 which terminates in a spout 11.

On top of the centrifugal collector is an outlet opening 12. There is connected to the centrifugal collector a pipe 13 through which hay and any other feed material may be transmitted into the collector, and from the collector discharged through the spout 11. In the collector the material is given a centrifugal motion, due to the force of the air used to drive the material into the collector, which tends to remove dust and such material from the hay and discharge it out at the opening 12 so that the hay is delivered into the interior of the building substantially free from dust and such materials. The free end of the pipe 13 is supported by means of a rope 16, which passes over a pulley 15 supported on a platform 14 attached to one side of the building.

On the silo wall is a cone-shaped roof 17, which has in its apex an opening 18. In this opening is a circular frame 19. This frame may be used for supporting one end of each rafter used for supporting the roof 17, while the other ends of these rafters are supported on the wall 4.

As shown in Figure 2, a platform 20 may be supported over the opening 18 in the frame 19. As shown in Figure 1, there is no means provided for distributing the hay which is caught upon the platform in a pile 21. The hay will be distributed from the platform in a haphazard way and not equally distributed to all parts of the compartment in which the hay is to be distributed. In order to avoid this haphazard and uneven distribution of the hay the platform may have mounted thereon a pedestal or stand 22.

This pedestal supports a vertically disposed shaft 26, which has on its upper end a plate 23 supported by means of a pivot 24. This plate may be adjusted by means of a screw 25 passing through a slot in the arcuate bracket 25a on the lower surface of the plate. The plate is pivoted to the upper end of the shaft 26 above the platform.

On the lower end of this shaft 26, below the platform, is a gear 27 which meshes with a pinion 28 on the end of the shaft of a motor 29 supported by means of brackets 30 on the under side of the platform. The inclination of the plate 23 may be adjusted by the screw 25. This plate is shown in full lines in one position and in dotted lines in another position. When the plate has been properly adjusted with relation to the shaft 26 the operation of the motor will cause the shaft 26 to rotate and thereby rotate the plate.

This plate is located immediately beneath the spout 11 so that the hay or other material discharged from the spout will fall upon the plate, substantially over the shaft 26, so that the rotation of the plate will distribute the hay to all parts of the annular chamber around the silo part of the building.

In the form shown in Figure 4 the platform is provided with a peripheral groove 31, in which a rope 32 fits and operates for rotating the platform. This rope passes over two guide pulleys 33 and is suitably attached to some operating mechanism, not shown. In this form the plate 23 is adjusted with relation to the platform by means of a spring 34 and an adjusting screw 35.

In the form shown in Figure 5 the plate is pivoted at one edge by means of a hinge 37 to a platform 36 composed of the same material as the frame 19. Adjacent an opposite edge of the plate 23 is a bracket 38, which cooperates with a bracket 39 attached to the platform 36 for holding the plate 23 in adjustment. This adjustment is effected by means of a screw 40, by which the brackets 38 and 39 may be adjusted with relation to each other to vary the amount of tilt given to the plate 23.

In Figure 6 there is shown a discharge chute 41 extending through the opening in the apex of the silo roof. In order to permit this chute to be extended through the opening the platform and the parts supported thereon are removed. On the lower end of this chute is a mouth 42, which has therein a plurality of fixed arcuate guide vanes 43. This chute extends through the opening into the silo so that the material may be delivered into the silo from the pipe 13.

Since the material delivered into the silo does not have to be spread over such a wide territory a rotating plate is unnecessary for the distribution of the material. It can be properly distributed by means of the arcuate guide vanes 43, located in the interior of the mouth of the chute.

The foregoing structures are such that an equal distribution of the feed, such as hay and other similar feed materials, may be accomplished to all parts of the building. In the case of the annular chamber the tilting plate and rotating platform serve to distribute the material to all parts thereof, while the material is distributed to all parts of the silo by means of the arcuate vanes at the end of the chute.

It will be understood that I desire to comprehend within my invention such modifications as come within the scope of my claims and my invention.

Having thus fully described my invention, what I claim as new and desire to secure by Letters Patent, is:

1. In a hay distributing mechanism, a platform, a single angularly disposed plate forming the sole support for the hay and adapted for receiving and deflecting the hay, means of adjustably supporting said plate, means of yieldingly accommodating the load of hay imposed on said plate, and means of rotating said plate.

2. In combination, in a hay delivery mechanism, of a single angularly disposed plate forming the sole support for the hay, means to adjust the angularity thereof, and means to rotate said plate for deflection of the hay laterally in a rotary path, said last named means being mounted beneath said plate.

3. In combination, in a hay deflecting mechanism, of a single receiving plate forming the sole support for the hay, means of delivering the hay thereon, power-driven means for deflecting said hay laterally off of said plate in an annular path, said last named means being mounted beneath said plate.

4. The combination, in a hay deflecting mechanism, of a single receiving plate forming the sole support for the hay, means for delivering the hay thereon, power-driven means for deflecting said hay laterally off of said plate in an annular path, and a cone associated therewith below said plate for cooperating and deflecting said hay, said last named means being mounted beneath said plate.

5. In a material handling apparatus, in combination with a building having an annular chamber and an inner chamber surrounded by the annular chamber, a roof for the inner chamber and supported thereby, and means supported by the roof for distributing material to the annular chamber.

6. In a material handling apparatus, in combination with a building having an annular chamber and an inner chamber surrounded by the annular chamber, a roof for the inner chamber and supported thereby, a table supported by the roof, a tiltable plate supported by the table, and means to rotate the plate to distribute material deposited on the plate.

7. In a material handling apparatus, in combination with a building having an inner chamber and an annular chamber around the inner chamber, a roof for the inner chamber, said roof having in its top an opening, and a closure for said opening having means thereon for distributing material to the annular chamber.

8. In a material handling apparatus, in combination with a building having an inner chamber and an outer chamber around the inner chamber, a roof for the inner chamber, said roof having an opening therein, a closure for said opening and means rotatably mounted on the closure for receiving material and distributing it to the outer chamber.

9. In a material handling apparatus, in combination with a building having an inner chamber and an outer chamber around the inner chamber, a roof for the inner chamber, said roof having an opening therein, a closure for said opening, a shaft rotatably mounted on said closure, a plate tiltably mounted on the shaft for receiving material and distributing it to the outer chamber, and means to rotate the shaft and the plate.

10. In a material handling apparatus, in combination with a building having an inner chamber and an outer chamber around the inner chamber, a roof for the inner chamber, said roof having an opening therein, a closure for said opening, a shaft rotatably mounted on said closure, a plate tiltably mounted on the shaft for receiving material and distributing it to the outer chamber, and means to rotate the shaft and the plate, said means consisting of a motor supported by the closure.

11. In a material handling apparatus, in combination with a building having an inner chamber and an outer chamber around the inner chamber, a roof for the inner chamber, said roof having an opening therein, a closure for said opening, a vertically disposed shaft supported by the closure, a plate pivoted to the upper end of the shaft, means to adjust the plate, and a motor on the closure having an operative connection with the shaft to rotate the shaft and the plate for distributing to the outer chamber material delivered to the plate.

JOHN G. SHODRON.